(12) United States Patent
Raghavan et al.

(10) Patent No.: US 10,659,132 B2
(45) Date of Patent: May 19, 2020

(54) BEAM SCANNING PERIOD CONFIGURATION

(71) Applicant: QUALCOMM Incorporated, San Diego, CA (US)

(72) Inventors: Vasanthan Raghavan, West Windsor Township, NJ (US); Valentin Alexandru Gheorghiu, Tokyo (JP); Awlok Singh Josan, San Francisco, CA (US); Jung Ryu, Fort Lee, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/167,050

(22) Filed: Oct. 22, 2018

(65) Prior Publication Data

US 2019/0123803 A1  Apr. 25, 2019

Related U.S. Application Data

(60) Provisional application No. 62/576,491, filed on Oct. 24, 2017.

(51) Int. Cl.
*H04L 5/12* (2006.01)
*H04B 7/06* (2006.01)
(Continued)

(52) U.S. Cl.
CPC .......... *H04B 7/0639* (2013.01); *H04B 7/043* (2013.01); *H04B 7/0695* (2013.01); *H04B 7/086* (2013.01);
(Continued)

(58) Field of Classification Search
CPC .... H04B 7/0639; H04B 17/318; H04B 7/043; H04B 7/0695; H04B 7/086; H04B 7/088;
(Continued)

(56) References Cited

U.S. PATENT DOCUMENTS 9,119,146 B2* 8/2015 Anas ................ H04W 72/1231
2013/0194991 A1* 8/2013 Vannithamby ....... H04B 7/0639
370/311
(Continued)

FOREIGN PATENT DOCUMENTS

CN      106797573 A       5/2017
WO    WO-2017063661 A1   4/2017

OTHER PUBLICATIONS

International Search Report and Written Opinion—PCT/US2018/057017—ISA/EPO—dated Dec. 10, 2018.

*Primary Examiner* — Helene E Tayong
(74) *Attorney, Agent, or Firm* — Harrity & Harrity, LLP/Qualcomm

(57) ABSTRACT

Certain aspects of the present disclosure generally relate to wireless communication. In some aspects, a user equipment may monitor for a beam scanning period indicator from a base station; configure an interval for beam scanning; and beam scan with a set of beams at the interval for beam scanning. In some aspects, a base station may configure an interval for beam scanning by a user equipment; selectively provide, to the user equipment, a beam scanning period indicator identifying the interval for beam scanning; and provide at least one beam from a set of beams in a synchronization codebook to enable the user equipment to perform beam scanning using the interval. Numerous other aspects are provided.

22 Claims, 9 Drawing Sheets

(51) Int. Cl.
   *H04B 7/08* (2006.01)
   *H04B 7/0426* (2017.01)
   *H04B 17/318* (2015.01)
   *H04W 48/08* (2009.01)
   *H04W 72/04* (2009.01)
   *H04W 16/28* (2009.01)
   *H04W 24/10* (2009.01)

(52) U.S. Cl.
   CPC ............ *H04B 7/088* (2013.01); *H04B 17/318* (2015.01); *H04W 48/08* (2013.01); *H04W 16/28* (2013.01); *H04W 24/10* (2013.01); *H04W 72/046* (2013.01)

(58) Field of Classification Search
   CPC ........ H04B 7/06; H04W 24/10; H04W 48/08; H04W 16/28; H04W 72/046
   USPC ......................................................... 375/262
   See application file for complete search history.

(56) References Cited

U.S. PATENT DOCUMENTS

| | | | |
|---|---|---|---|
| 2014/0198696 A1* | 7/2014 | Li | H04W 52/0229 370/311 |
| 2015/0358129 A1 | 12/2015 | Ryu et al. | |
| 2017/0054534 A1 | 2/2017 | Sang et al. | |
| 2017/0302355 A1* | 10/2017 | Islam | H04B 7/0639 |
| 2017/0311322 A1* | 10/2017 | Kim | H04W 72/12 |
| 2018/0042045 A1* | 2/2018 | Choi | H04W 16/14 |
| 2018/0279213 A1 | 9/2018 | Raghavan et al. | |

\* cited by examiner

BEAM SCANNING PERIOD CONFIGURATION

CROSS-REFERENCE TO RELATED APPLICATIONS UNDER 35 U.S.C. § 119

This application claims priority to U.S. Provisional Patent Application No. 62/576,491, filed on Oct. 24, 2017, entitled "TECHNIQUES AND APPARATUSES FOR BEAM SCANNING PERIOD CONFIGURATION," which is hereby expressly incorporated by reference herein.

FIELD OF THE DISCLOSURE

Aspects of the present disclosure generally relate to wireless communication, and more particularly to techniques and apparatuses for beam scanning period configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication may include receiving a beam scanning period indicator from a base station. The method may include configuring an interval for beam scanning based at least in part on the beam scanning period indicator. The method may include beam scanning to measure a set of beams at the interval for beam scanning based at least in part on configuring the interval for beam scanning.

In some aspects, a user equipment for wireless communication may include a memory and one or more processors operatively coupled to the memory. The memory and the one or more processors may be configured to receive a beam scanning period indicator from a base station. The memory and the one or more processors may be configured to configure an interval for beam scanning based at least in part on the beam scanning period indicator. The memory and the one or more processors may be configured to beam scan to measure a set of beams at the interval for beam scanning based at least in part on configuring the interval for beam scanning.

In some aspects, a non-transitory computer-readable medium may store one or more instructions for wireless communication. The one or more instructions, when executed by one or more processors of a user equipment, may cause the one or more processors to receive a beam scanning period indicator from a base station. The one or more instructions, when executed by the one or more processors, may cause the one or more processors to configure an interval for beam scanning based at least in part on the beam scanning period indicator. The one or more instructions, when executed by the one or more processors, may cause the one or more processors to beam scan to measure a set of beams at the interval for beam scanning based at least in part on configuring the interval for beam scanning.

In some aspects, an apparatus for wireless communication may include means for receiving a beam scanning period indicator from a base station. The apparatus may include means for configuring an interval for beam scanning based at least in part on the beam scanning period indicator. The apparatus may include means for beam scanning to measure a set of beams at the interval for beam scanning based at least in part on configuring the interval for beam scanning.

In some aspects, a method of wireless communication may include providing, to a user equipment, a beam scanning period indicator identifying the interval for beam scanning based at least in part on configuring the interval for beam scanning. The method may include providing at least one beam from a set of beams in a synchronization codebook to enable the user equipment to measure the at least one beam in accordance with the interval and based at least in part on providing the beam scanning period indicator.

In some aspects, a base station for wireless communication may include a memory and one or more processors operatively coupled to the memory. The memory and the one or more processors may be configured to provide, to a user equipment, a beam scanning period indicator identifying the interval for beam scanning based at least in part on configuring the interval for beam scanning. The memory and the one or more processors may be configured to provide at least one beam from a set of beams in a synchronization codebook to enable the user equipment to measure the at least one beam in accordance with the interval and based at least in part on providing the beam scanning period indicator.

In some aspects, a non-transitory computer-readable medium may store one or more instructions for wireless communication. The one or more instructions, when executed by one or more processors of a base station, may cause the one or more processors to provide, to a user equipment, a beam scanning period indicator identifying the interval for beam scanning based at least in part on configuring the interval for beam scanning. The one or more instructions, when executed by the one or more processors, may cause the one or more processors to provide at least one beam from a set of beams in a synchronization codebook to enable the user equipment to measure the at least one beam in accordance with the interval and based at least in part on providing the beam scanning period indicator.

In some aspects, an apparatus for wireless communication may include means for providing, to a user equipment, a beam scanning period indicator identifying the interval for beam scanning based at least in part on configuring the interval for beam scanning. The apparatus may include means for providing at least one beam from a set of beams in a synchronization codebook to enable the user equipment to measure the at least one beam in accordance with the interval and based at least in part on providing the beam scanning period indicator.

Aspects generally include a method, apparatus, device, computer program product, non-transitory computer-readable medium, user equipment, wireless communication device, base station, access point, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
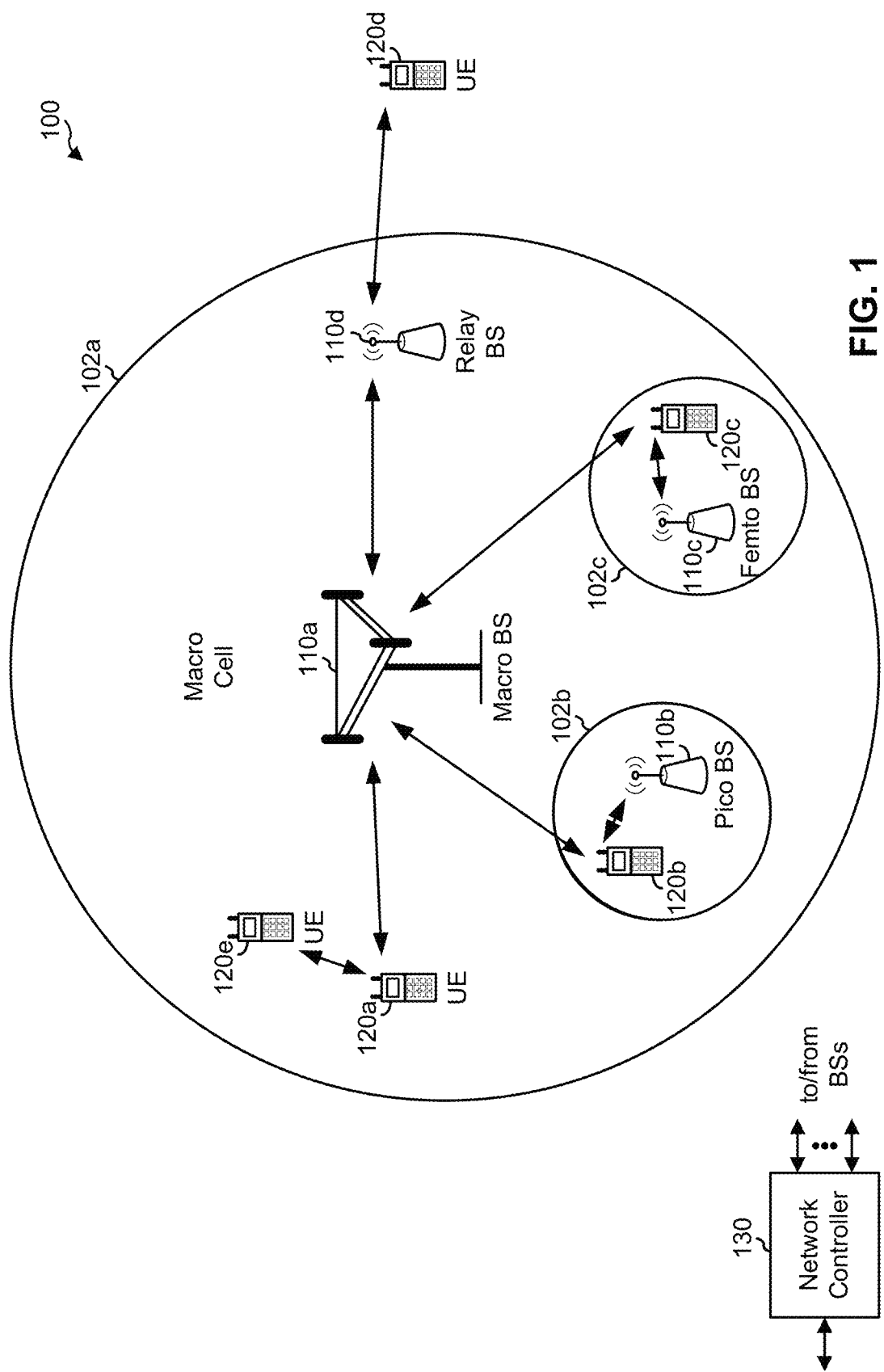
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
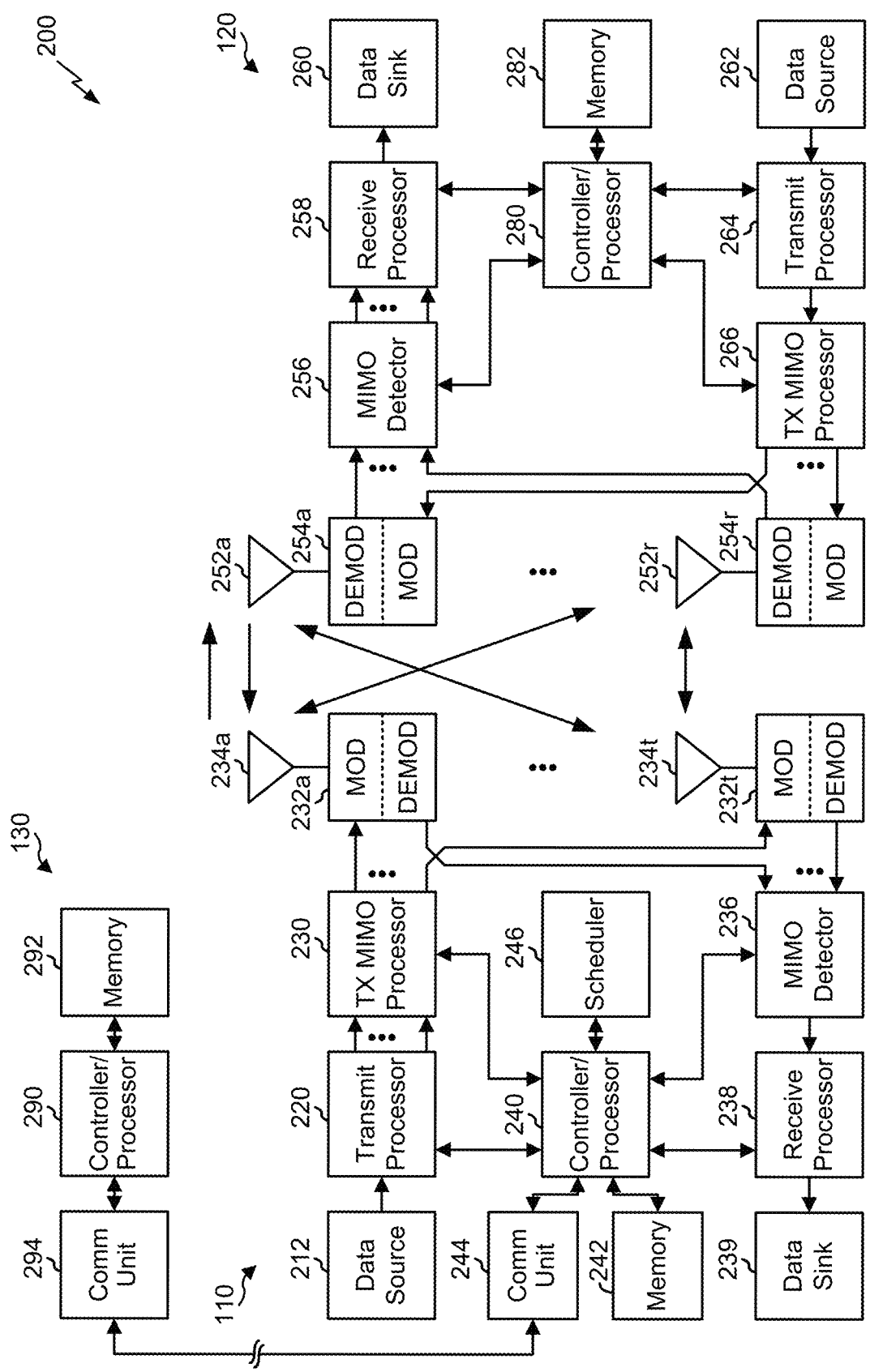
FIG. 2 is a block diagram conceptually illustrating an example of a base station in communication with a user equipment (UE) in a wireless communication network, in accordance with certain various of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with beam scanning period configuration, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a beam scanning period indicator from a base station, means for configuring an interval for beam scanning based at least in part on the beam scanning period indicator, means for beam scanning to measure a set of beams at the interval for beam scanning based at least in part on configuring the interval for beam scanning, and/or the like. In some aspects, such means may include one or more components of UE 120 described in connection with FIG. 2.

In some aspects, base station 110 may include means for providing, to a user equipment, a beam scanning period indicator identifying an interval for beam scanning, means for providing at least one beam from a set of beams to enable the user equipment to measure the at least one beam using the interval and based at least in part on providing the beam scanning period indicator, and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3:
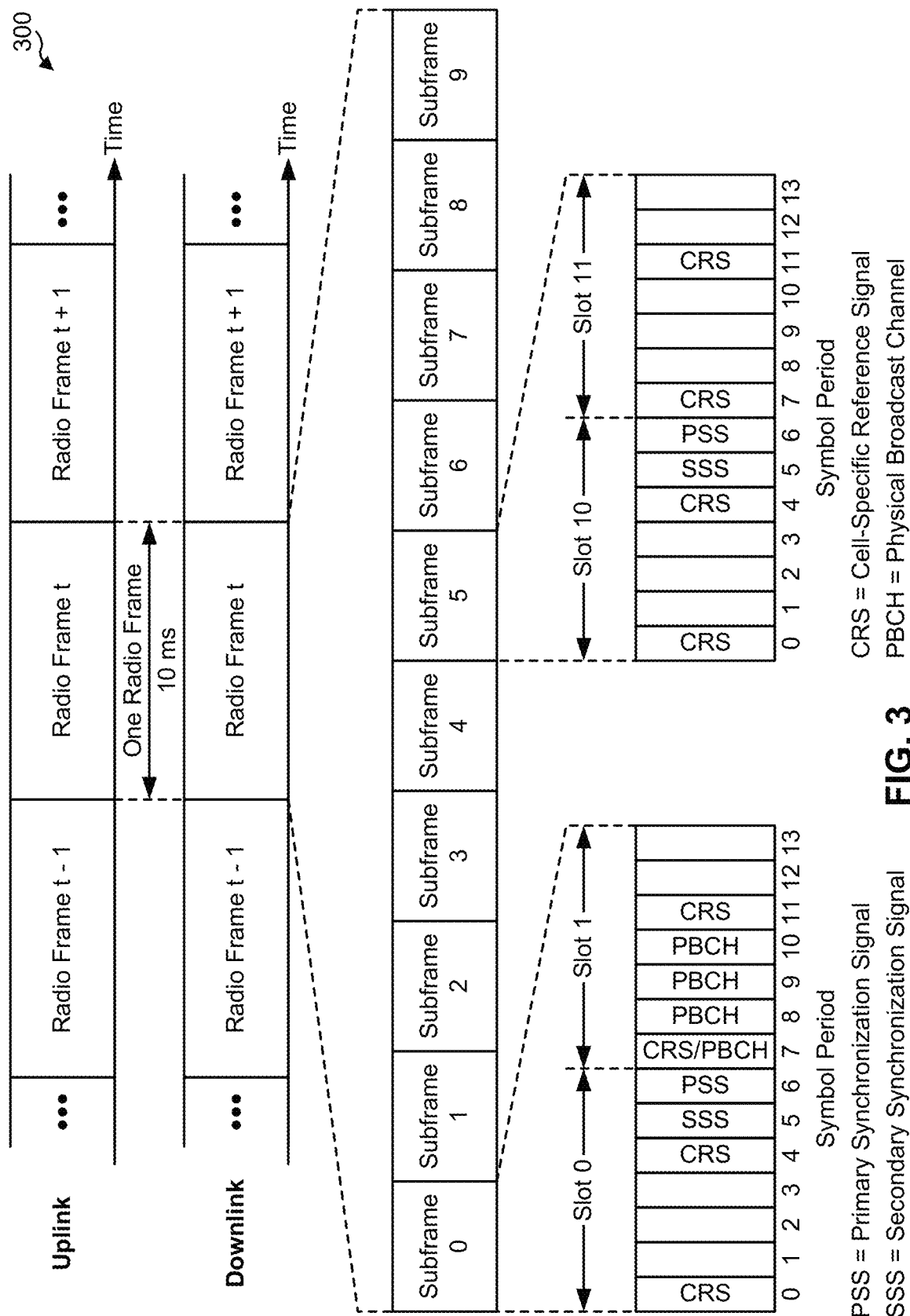
FIG. 3 is a block diagram conceptually illustrating an example of a frame structure in a wireless communication network, in accordance with various aspects of the present disclosure.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some other system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such as NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
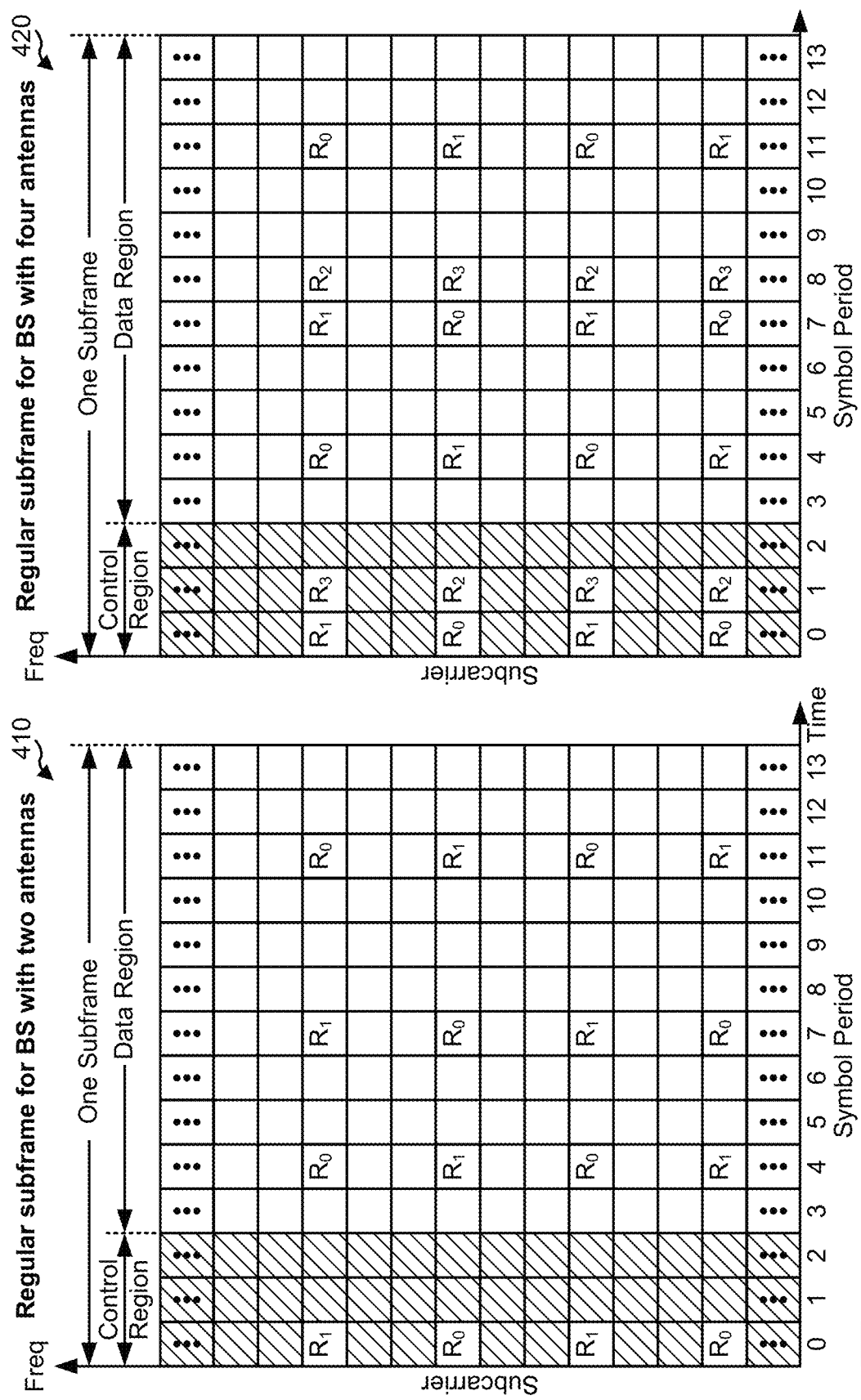
FIG. 4 is a block diagram conceptually illustrating two example subframe formats with the normal cyclic prefix, in accordance with various aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP Technical Specification (TS) 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, and/or the like, where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched.

Each subframe may include downlink/uplink (DL/UL) data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals. In some cases, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
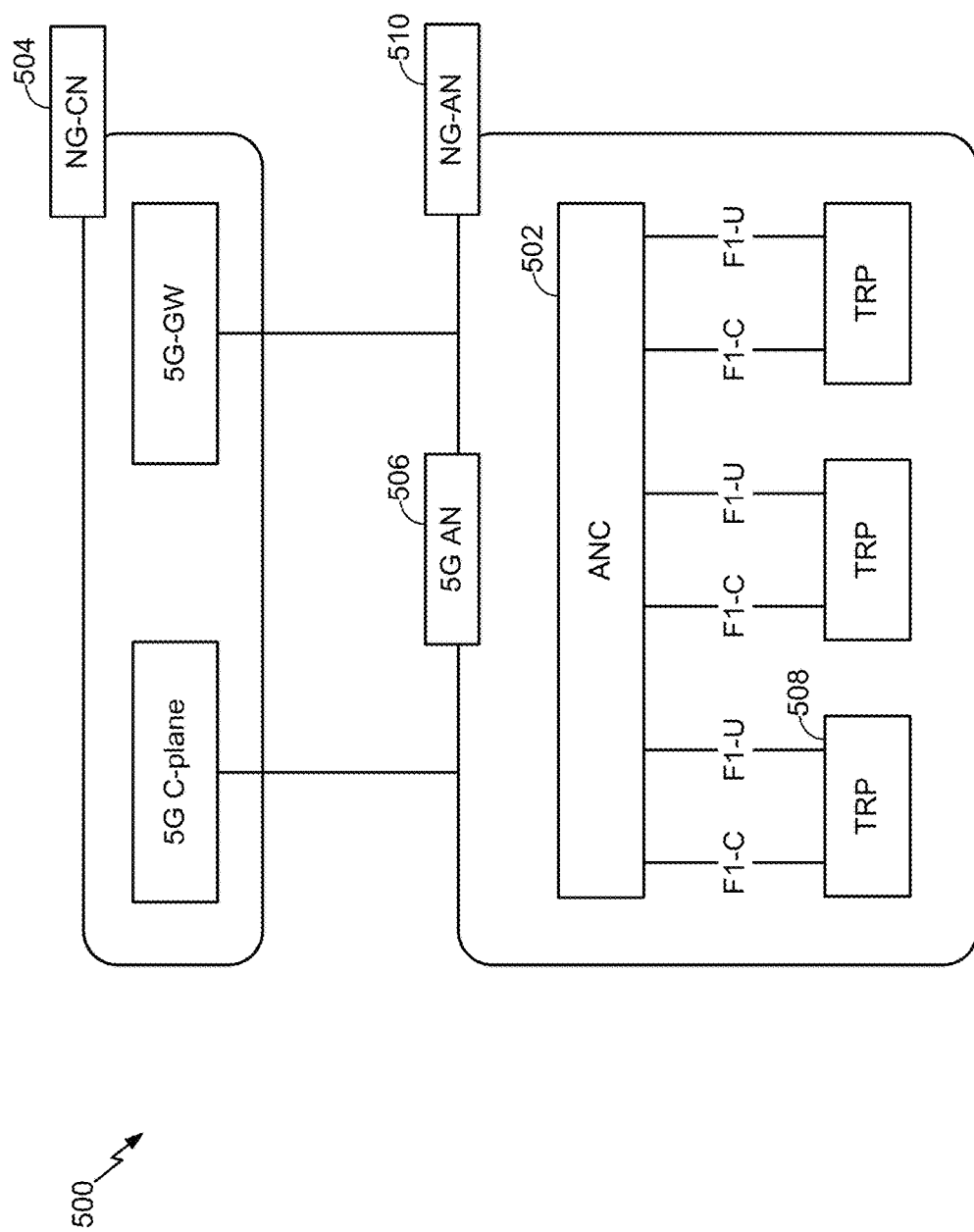
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
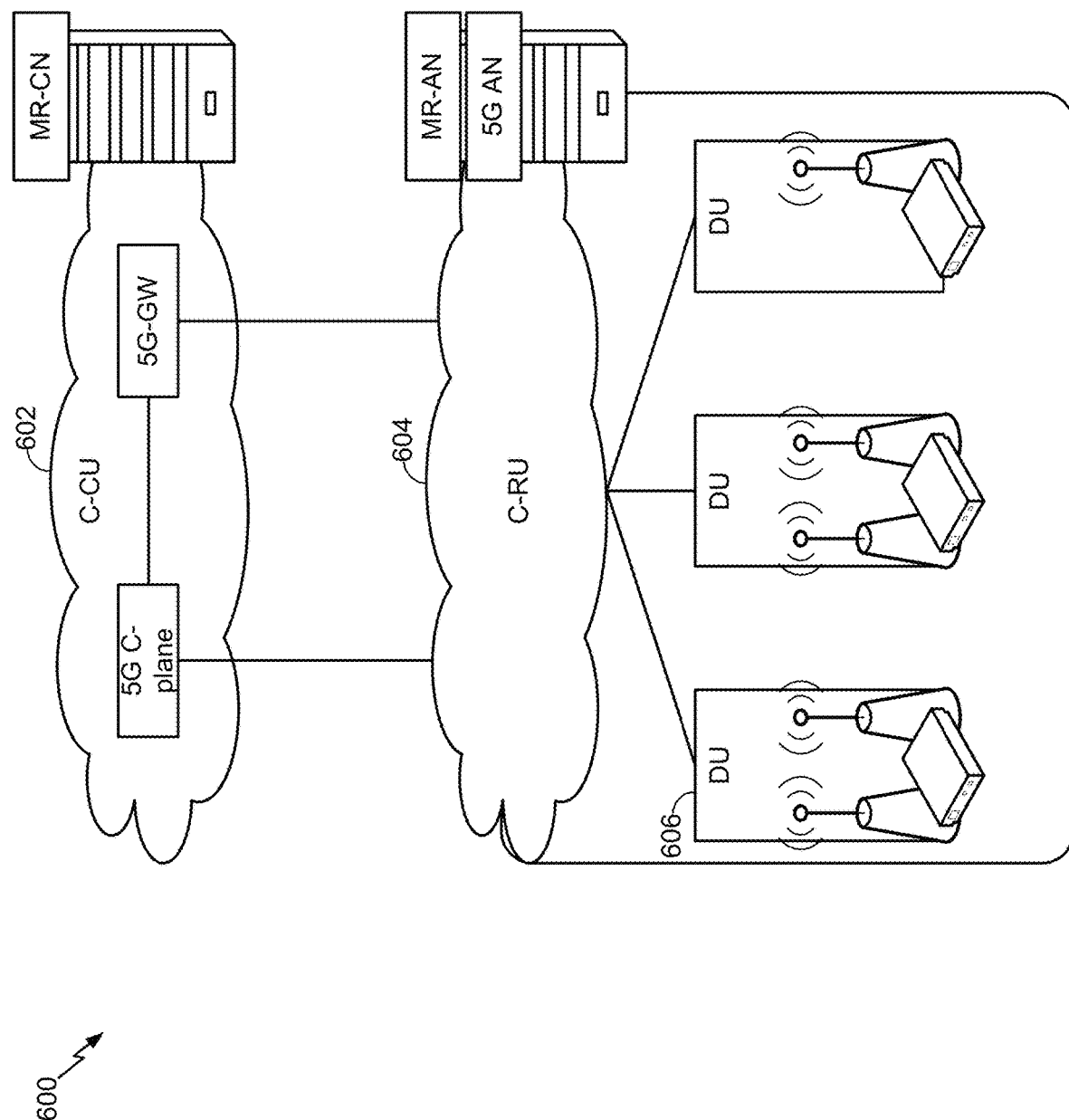
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

In certain communications systems, such as mmW 5G communications systems, beamforming may be used to enable directional beam based communication. Use of beamforming may be used to establish a link between a UE and a base station, and may enable a threshold data rate for transmissions between the UE and the base station. During operation, a plurality of base stations may, concurrently, transmit training symbols with at least one synchronization signal (SS) beam in a synchronization codebook, and the UE may receive and decode the training symbols. Based at least in part on decoding the training symbols, the UE may determine a set of beam pairs, which may be SS beams and corresponding UE beams, that are associated with a threshold signal to interference and noise ratio (SINR).

The UE may use the set of beams for beam refinement, beam reporting, diversity management for blockage, and/or the like. However, scanning for beams and determining beam pairs may be resource intensive, such as by causing the UE to use a threshold level of processing resources, memory resources, network resources, and/or the like. Moreover, a pre-configured interval for scanning of beams and determining beams may cause the UE to perform beam scanning more frequently or less frequently than is useful for the UE. For example, for a UE in a mobility state (e.g., a UE that is moving at a threshold speed), the pre-configured interval may result in the UE losing network connectivity as a result of failing to perform beam scanning within a threshold period of time corresponding to a threshold distance moved. In contrast, for a UE not in a mobility state (e.g., a static UE, such as a laptop computer, desktop computer, and/or the like), the pre-configured interval may result in excessive resource utilization from the UE obtaining the same set of beam pairs from each beam scan.

Some aspects, described herein, may provide for beam scanning period configuration. For example, a base station and/or a UE may configure a beam scanning period interval based at least in part on characteristics of a network, characteristics of the UE, and/or the like. In this way, the UE may reduce a resource utilization relative to using a pre-configured interval and/or may improve network performance and network connectivity relative to using the pre-configured interval.

Figure 7:
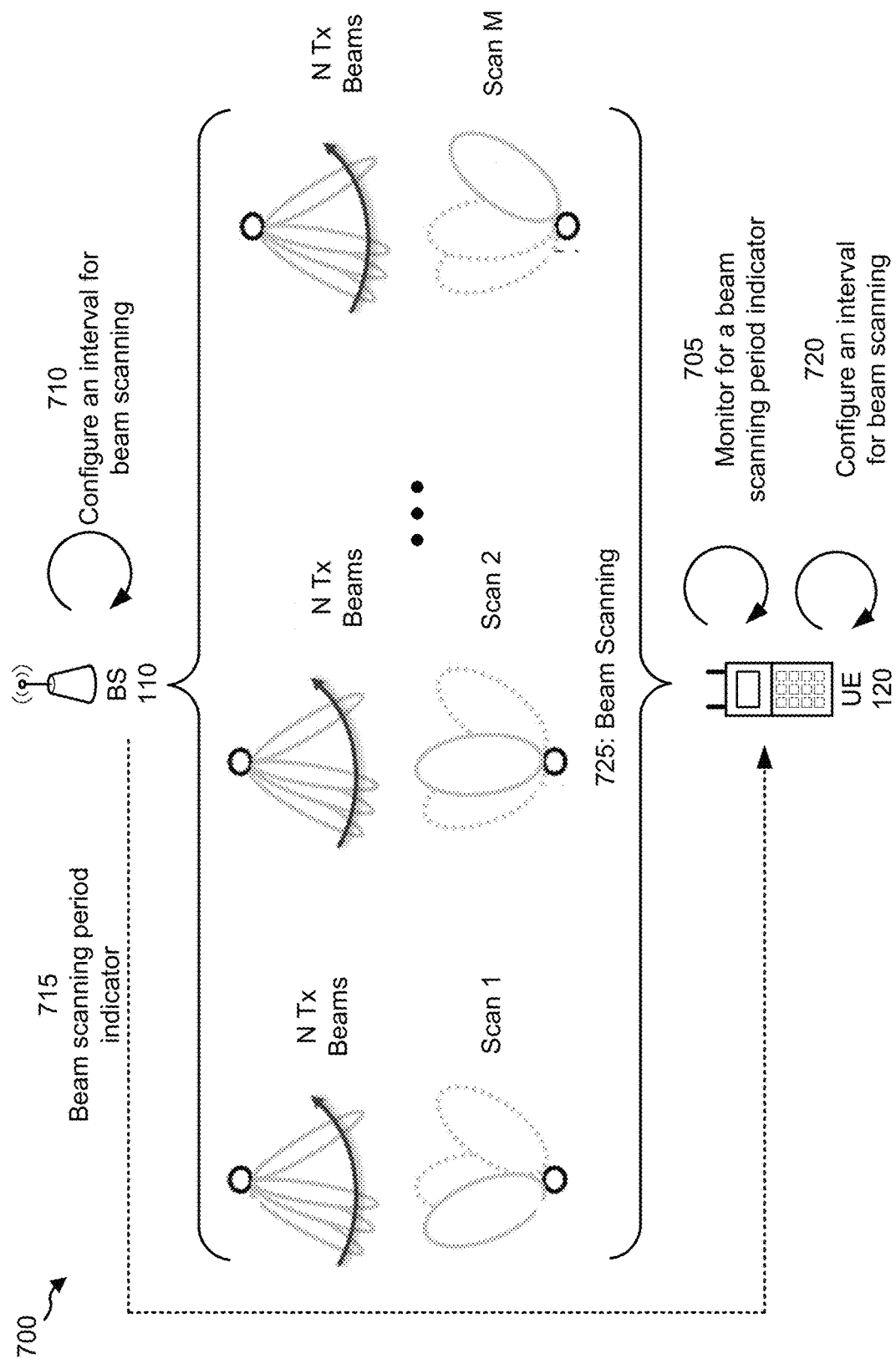
FIG. 7 is a diagram illustrating an example of beam scanning period configuration, in accordance with various aspects of the present disclosure.

FIG. 7 is a diagram illustrating an example 700 of beam scanning period configuration, in accordance with various aspects of the present disclosure. As shown in FIG. 7, example 700 includes a BS 110 and a UE 120.

As further shown in FIG. 7, and by reference number 705, UE 120 may monitor for a beam scanning period indicator. For example, UE 120 may attempt to receive the beam scanning period indicator from BS 110. In some aspects, UE 120 may receive the beam scanning period indicator. For example, BS 110 may configure an interval for beam scanning, as shown by reference number 710, and may provide the beam scanning period indicator, as shown by reference number 715.

In some aspects, UE 120 may receive a beam scanning period indicator indicating a beam scanning period associated with a discontinuous reception (DRX) mode cycle period. For example, for intra-frequency measurements without measurement gaps when no DRX cycle is configured, UE 120 may receive a beam scanning period indicator indicating a scanning period, T, of:

$$T = \max[400 \text{ milliseconds (ms)}, \text{ceil}(5*K_p)*N_3*SMTC_{period}];$$

where max represents a maximum function, ceil represents a ceiling function, K represents a quantity of beams, $N_3$ represents a threshold relating to a link quality, and $SMTC_{period}$ represents a synchronization signal/physical broadcast channel block measurement time configuration period. In this case, when a plurality of SMTC periodicities are configured for different cells, a required SMTC period is selected for use. Similarly, for intra-frequency measurements without measurement gaps when a DRX cycle period is less than or equal to 320 ms, the beam scanning period indicator may indicate a beam scanning period of:

$$T = \max[400 \text{ ms}, \text{ceil}(1.5 \times 5 \times K_p)*N_3*\max(SMTC_{period}, DRX \text{ cycle period})].$$

Similarly, for intra-frequency measurements without measurement gaps when a DRX cycle period is greater than 320 ms, the beam scanning period indicator may indicate a beam scanning period of:

$$T = \text{ceil}(5*K_p)*N_3*DRX \text{ cycle period}.$$

Similarly, for intra-frequency measurements with measurement gaps when no DRX cycle is configured, the beam scanning period indicator may indicate a beam scanning period of:

$$T = \max[400 \text{ ms}, 5*N_3 \times \max(MGRP, SMTC_{period})]$$

where MGRP represents a measurement gap repetition period. Similarly, for intra-frequency measurements with measurement gaps when a DRX cycle period is less than or equal to 320 ms, the beam scanning period indicator may indicate a beam scanning period of:

$$T = \max[400 \text{ ms}, \text{ceil}(1.5*5)*N_3*\max(MGRP, SMTC_{period}, DRX \text{ cycle period})].$$

Similarly, for intra-frequency measurements with measurement gaps when a DRX cycle period is greater than 320 ms, the beam scanning period indicator may indicate a beam scanning period of:

$$T = 5*N_3*\max(MGRP, DRX \text{ cycle period}).$$

Similarly, for inter-frequency measurements with measurement gaps when no DRX cycle is configured, the beam scanning period indicator may indicate a beam scanning period of:

$$T = \max[X_1 \text{ ms}, Y_1*N_6 \times \max[MGRP, SMTC_{period}]*CSF_{inter}]$$

where X and Y are pre-configured values and $CSF_{inter}$ represents a channel state feedback value for inter-frequency measurements. Similarly, for inter-frequency measurements with measurement gaps when a DRX cycle period is less than or equal to 320 ms, the beam scanning period indicator may indicate a beam scanning period of:

$$T = \max[X_2 \text{ ms}, Y_2*N_6*\max(MGRP, SMTC_{period}, DRX \text{ cycle period})*CSF_{inter}].$$

Similarly, for inter-frequency measurements with measurement gaps when a DRX cycle period is greater than 320 ms, the beam scanning period indicator may indicate a beam scanning period of:

$$T = Y_3 \times N_4*DRX \text{ cycle period}*CSF_{inter}.$$

In some aspects, UE 120 may not receive the beam scanning period indicator. For example, BS 110 may not be configured to provide the beam scanning period indicator; BS 110 may provide the beam scanning period indicator, but UE 120 may fail to receive the beam scanning period indicator (e.g., packet loss); and/or the like. Based at least in part on receiving the beam scanning period indicator or based at least in part on failing to receive the beam scanning period indicator while monitoring for the beam scanning period indicator, UE 120 may configure the interval for the beam scanning period, as shown by reference number 720.

In some aspects, the beam scanning period indicator may include information identifying an interval for a beam scanning period for UE 120. For example, BS 110 may configure a value for the interval, and may provide a beam scanning period indicator to identify the interval. Additionally, or alternatively, BS 110 may configure a range for the interval for a plurality of UEs 120 in a network (e.g., including the UE 120), and may provide a beam scanning period indicator identifying the range for the interval. For example, UE 120 may receive a beam scanning period indicator identifying a minimum interval and a maximum interval, and may select an interval based at least in part on the minimum interval and the maximum interval. In some aspects, UE 120 may determine the interval based at least in part on a pre-configured interval. For example, UE 120 may use the pre-configured interval as a maximum interval, a minimum interval, and/or the like, and may select the interval based at least in part on the maximum interval, the minimum interval, and/or the like.

Additionally, or alternatively, BS 110 may provide a beam scanning period indicator identifying a characteristic, which may enable UE 120 to configure the interval. For example, BS 110 may provide a metric identifying a beamwidth of scanning beams used by BS 110 (e.g., SS beams for beam scanning), and UE 120 may configure the interval based at least in part on the metric identifying the beamwidth.

In some aspects, UE 120 and/or BS 110 may configure the interval for the beam scanning period based at least in part on a mobility state of UE 120 (e.g., low mobility, medium mobility, high mobility). For example, UE 120 may provide mobility information to BS 110, and BS 110 may determine the interval for the beam scanning period based at least in part on the mobility information. In this case, UE 120 may provide mobility information identifying a mobility state (e.g., whether UE 120 is moving), a speed of UE 120, a Doppler measurement associated with UE 120 (e.g., performed by UE 120 or communicated to UE 120 by another device), and/or the like. In some aspects, the interval may correspond to the mobility state of UE 120. For example, when UE 120 is static or is associated with a speed of less than a speed threshold, the interval may be selected to be greater than a time threshold, thereby reducing the utilization of computing resources and/or network resources relative to a pre-configured interval of less than the time threshold. Additionally, or alternatively, when UE 120 is not static or is associated with a speed of greater than a speed threshold, the interval may be selected to be less than a time threshold to reduce the likelihood that UE 120 loses communication with BS 110 relative to a pre-configured interval of greater than the time threshold.

Additionally, or alternatively, UE 120 or B S 110 may determine the interval for the beam scanning period based at least in part on a metric identifying a quantity of beams used by BS 110 in beam scanning. In this case, when the quantity of beams is greater than a numerical threshold, which may correspond to a beamwidth of less than a beamwidth threshold, the interval may be less than a time threshold. Similarly, when the quantity of beams is less than a numerical threshold, which may correspond to a beamwidth of greater than a beamwidth threshold, the interval may be greater than a time threshold. In some aspects, UE 120 may predict a beamwidth of BS 110 based at least in part on a set of measurements of a beamwidth of BS 110 during previous beam scanning periods.

Additionally, or alternatively, UE 120 or B S 110 may determine the interval for the beam scanning period based at least in part on the network characteristics or base station characteristics. For example, BS 110 may determine a cell density (e.g., a quantity of cells in a particular area), a UE density (e.g., a quantity of UEs in a particular cell or cells), a data size for transmissions (e.g., an average payload of transmissions), and/or the like. Additionally, or alternatively, UE 120 or BS 110 may determine the interval for the beam scanning period based at least in part on a mode of UE 120. For example, a first interval may be selected when UE 120 is operating in a connected DRX (C-DRX) mode, a second interval may be selected when UE 120 is performing steady-state scanning, and/or the like.

Additionally, or alternatively, UE 120 or BS 110 may determine the interval for the beam scanning period based at least in part on a use-case of UE 120. For example, UE 120 may configure a first interval for the beam scanning period when UE 120 determines that UE 120 is a sensor device and a second interval for the beam scanning period when UE 120 determines that UE 120 is a communication device. Additionally, or alternatively, UE 120 or B S 110 may determine the interval for the beam scanning period based at least in part on a predicted data rate for transmission associated with BS 110. Additionally, or alternatively, UE 120 or BS 110 may determine the interval for the beam scanning period based at least in part on a power consumption of UE 120. For example, UE 120 may configure an interval greater than a time threshold to reduce a power consumption of UE 120, such as when UE 120 is associated with less than a threshold battery life. Similarly, UE 120 may configure an interval greater than a time threshold to reduce a processing utilization of UE 120, such as when UE 120 is associated with less than a threshold amount of processing resources.

As further shown in FIG. 7, and by reference number 725, UE 120 may perform beam scanning based at least in part on configuring the interval for the beam scanning period. For example, after a period of time corresponding to the interval has elapsed from a previous beam scanning period, BS 110 may provide a quantity, N, of TX beams (e.g., sequentially, concurrently, and/or the like) from a set of beams in a synchronization codebook, and UE 120 may perform a quantity, M, of scans to detect the N beams. In some aspects, UE 120 may perform beam scanning to detect a plurality of beams from a plurality of BSs 110, which may transmit the plurality of beams concurrently, consecutively, and/or the like.

In some aspects, UE 120 may scan for each of the N beams. In some aspects, UE 120 may scan for a threshold quantity, M, of beams, and may stop scanning before scanning each of the N beams. For example, UE 120 may attempt to scan 16 beams, 24 beams, and/or the like. In some aspects, UE 120 mays select a subset of beams. For example, UE 120 may determine the subset of beams with a highest SINR value, and may store information identifying the subset of beams in a beam table to enable UE 120 to use the subset of beams for beamforming. In this way, UE 120 may configure the interval for beam scanning, and may perform beam scanning with reduced resource utilization and/or improved network connectivity relative to using a pre-configured interval.

As indicated above, FIG. 7 is provided as an example. Other examples are possible and may differ from what was described with respect to FIG. 7.

Figure 8:
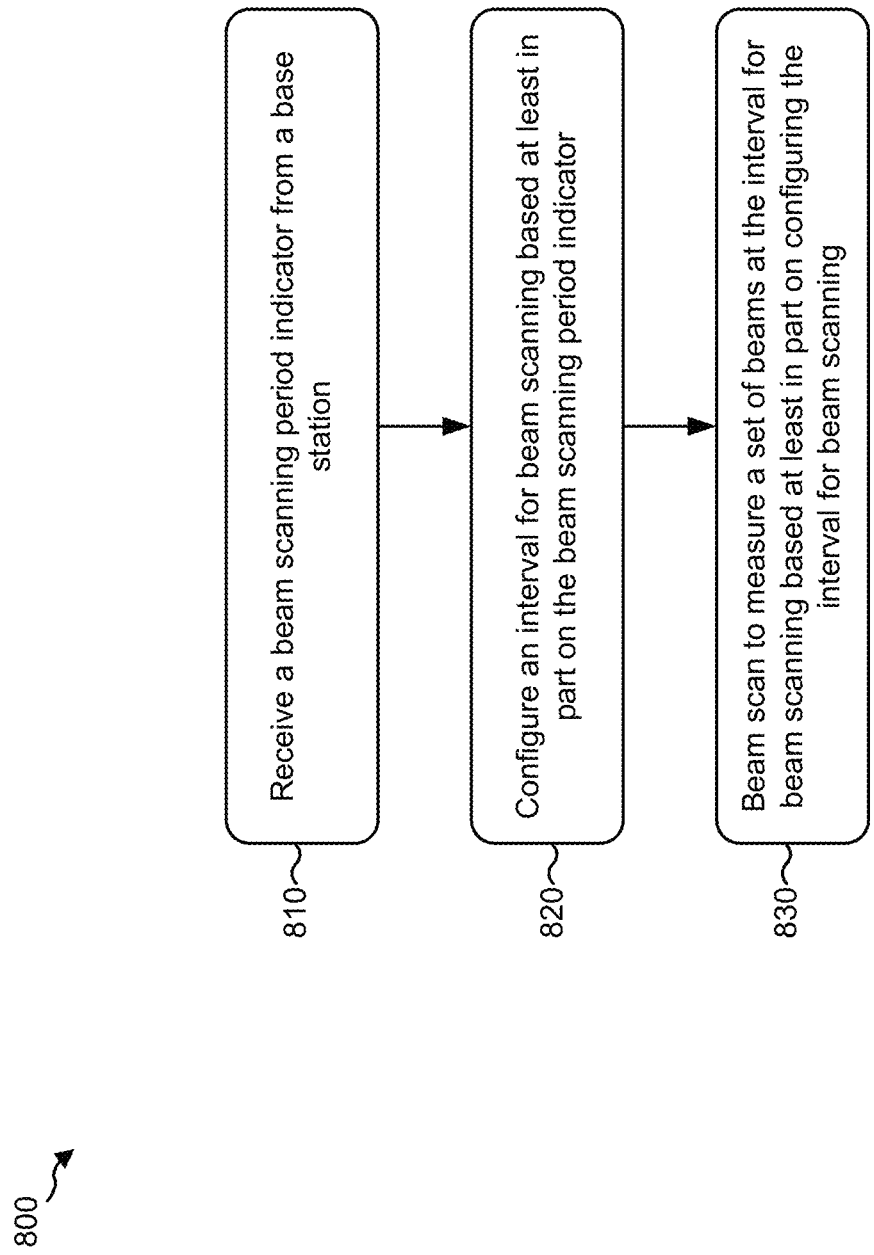
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120) performs beam scanning period configuration.

As shown in FIG. 8, in some aspects, process 800 may include receiving a beam scanning period indicator from a base station (block 810). For example, the UE (e.g., using antenna 252, DEMOD 254, MIMO detector 256, receive processor 258, controller/processor 280, and/or the like) may receive a beam scanning period indicator from a base station, as described above.

As shown in FIG. 8, in some aspects, process 800 may include configuring an interval for beam scanning based at least in part on the beam scanning period indicator (block 820). For example, the UE (e.g., using controller/processor 280 and/or the like) may configure an interval for beam scanning based at least in part on the beam scanning period indicator, as described above.

As shown in FIG. 8, in some aspects, process 800 may include beam scanning to measure a set of beams at the interval for beam scanning based at least in part on configuring the interval for beam scanning (block 830). For example, the UE (e.g., using antenna 252, DEMOD 254, MIMO detector 256, receive processor 258, controller/processor 280, and/or the like) may beam scan to measure a set of beams at the interval for beam scanning based at least in part on configuring the interval for beam scanning, as described above.

Process 800 may include additional aspects, such as any single aspect or any combination of aspects described below and/or in connection with one or more other processes described elsewhere herein.

In some aspects, the beam scanning period indicator is received based at least in part on monitoring for the beam scanning period indicator. In some aspects, the beam scanning period indicator may not be received based at least in part on the monitoring. In some aspects, the interval may be configured based at least in part on a characteristic associated with the user equipment, and the characteristic may be related to a network of the user equipment, a mobility state of the user equipment, a mode of the user equipment, a use case of the user equipment, a predicted data rate for the user equipment, a power consumption the user equipment, and/or the like.

In some aspects, the interval may be configured based at least in part on a characteristic associated with the base station, and the characteristic may be related to a quantity of beams used by the base station in beam scanning, a bandwidth for the base station, a cell size for the base station, a user equipment density for the base station, a payload size associated with the base station, a predicted data rate for transmissions associated with the base station, a beamwidth of beams used by the base station, and/or the like. In some aspects, the beamwidth of beams used by the base station may be determined based at least in part on one or more measurements. In some aspects, the interval may be configured based at least in part on an interval range identified based at least in part on the beam scanning period indicator.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
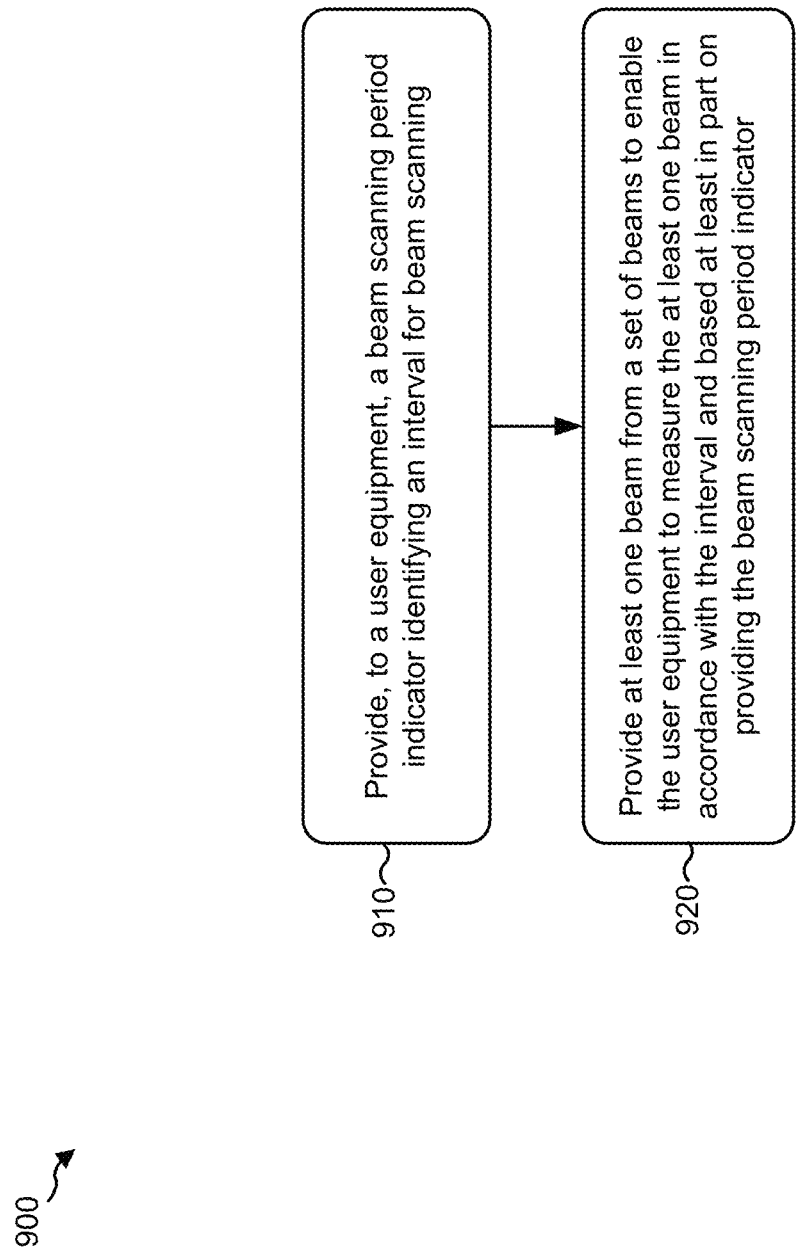
FIG. 9 is a diagram illustrating an example process performed, for example, by a base station, in accordance with various aspects of the present disclosure.

FIG. 9 is a diagram illustrating an example process 900 performed, for example, by a BS, in accordance with various aspects of the present disclosure. Example process 900 is an example where a BS (e.g., BS 110) performs beam scanning period configuration.

As shown in FIG. 9, in some aspects, process 900 may include providing, to a user equipment, a beam scanning period indicator identifying an interval for beam scanning (block 910). For example, the BS (e.g., using controller/processor 240, transmit processor 220, TX MIMO processor 230, MOD 232, antenna 234, and/or the like) may provide, to a user equipment, a beam scanning period indicator identifying an interval for beam scanning, as described above.

As shown in FIG. 9, in some aspects, process 900 may include providing at least one beam from a set of beams to enable the user equipment to measure the at least one beam in accordance with the interval and based at least in part on providing the beam scanning period indicator (block 920). For example, the BS (e.g., using controller/processor 240, transmit processor 220, TX MIMO processor 230, MOD 232, antenna 234, and/or the like) may provide at least one beam from a set of beams to enable the user equipment to measure the at least one beam in accordance with the interval and based at least in part on providing the beam scanning period indicator.

Process 900 may include additional aspects, such as any single aspect or any combination of aspects described below and/or in connection with one or more other processes described elsewhere herein.

In some aspects, the BS is configured to provide the beam scanning period indicator based at least in part on configuring the interval for beam scanning. In some aspects, the interval may be configured based at least in part on a characteristic associated with the user equipment, and the characteristic may be related a network of the user equipment, a mobility state of the user equipment, a mode of the user equipment, a use case of the user equipment, a predicted data rate for the user equipment, a power consumption of the user equipment, and/or the like.

In some aspects, the interval may be configured based at least in part on a characteristic associated with the base station, and the characteristic may relate to a quantity of beams used by the base station in beam scanning, a bandwidth for the base station, a cell size for the base station, a user equipment density for the base station, a payload size associated with the base station, a predicted data rate for transmissions associated with the base station, a beamwidth of beams used by the base station, and/or the like. In some aspects, the beam scanning period indicator may identify a range for the interval.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communications by a user equipment, comprising:
   receiving a beam scanning period indicator from a base station;
   configuring an interval for beam scanning based at least in part on the beam scanning period indicator,
      wherein the beam scanning period indicator indicates a beam scanning period,
      wherein different beam scanning periods are associated with different combinations of discontinuous reception (DRX) mode cycle periods and measurement gaps of intra-frequency measurements,
      wherein a first beam scanning period is associated with a first DRX mode cycle period that satisfies a threshold and for infra-frequency measurements without measurement gaps, and
      wherein a second beam scanning period is associated with a second DRX mode cycle period that does not satisfy a threshold and for infra-frequency measurements with measurement gaps; and
   beam scanning to measure a set of beams at the interval for beam scanning based at least in part on configuring the interval for beam scanning.

2. The method of claim 1, wherein the beam scanning period indicator is received based at least in part on monitoring for the beam scanning period indicator.

3. The method of claim 1, wherein the interval is configured based at least in part on a characteristic associated with the user equipment; and
   wherein the characteristic relates to at least one of:
      a network of the user equipment,
      a mobility state of the user equipment,
      a mode of the user equipment,
      a use case of the user equipment,
      a predicted data rate for the user equipment, or
      a power consumption of the user equipment.

4. The method of claim 1, wherein the interval is configured based at least in part on a characteristic associated with the base station; and
   wherein the characteristic relates to at least one of:
      a quantity of beams used by the base station in beam scanning,
      a bandwidth for the base station,
      a cell size for the base station,
      a user equipment density for the base station,
      a payload size associated with the base station,
      a predicted data rate for transmissions associated with the base station, or
      a beamwidth of beams used by the base station.

5. The method of claim 4, wherein the beamwidth of beams used by the base station is determined based at least in part on one or more measurements.

6. The method of claim 1, wherein the interval is configured based at least in part on an interval range identified based at least in part on the beam scanning period indicator.

7. A method of wireless communications by a base station, comprising:
   providing, to a user equipment, a beam scanning period indicator identifying an interval for beam scanning,
      wherein the beam scanning period indicator indicates a beam scanning period,
      wherein different beam scanning periods are associated with different combinations of discontinuous reception (DRX) mode cycle periods and measurement gaps of intra-frequency measurements,
      wherein a first beam scanning period is associated with a first DRX mode cycle period that satisfies a threshold and for infra-frequency measurements without measurement gaps, and
      wherein a second beam scanning period is associated with a second DRX mode cycle period that does not satisfy a threshold and for infra-frequency measurements with measurement gaps; and
   providing at least one beam from a set of beams to enable the user equipment to measure the at least one beam in accordance with the interval and based at least in part on providing the beam scanning period indicator.

8. The method of claim 7, wherein the base station is configured to provide the beam scanning period indicator based at least in part on configuring the interval for beam scanning.

9. The method of claim 7, wherein the interval is configured based at least in part on a characteristic associated with the user equipment; and
   wherein the characteristic relates to at least one of:
      a network of the user equipment,
      a mobility state of the user equipment,
      a mode of the user equipment,
      a use case of the user equipment,
      a predicted data rate for the user equipment, or
      a power consumption of the user equipment.

10. The method of claim 7, wherein the interval is configured based at least in part on a characteristic associated with the base station; and
    wherein the characteristic relates to at least one of:
       a quantity of beams used by the base station in beam scanning,
       a bandwidth for the base station,
       a cell size for the base station,
       a user equipment density for the base station,
       a payload size associated with the base station,
       a predicted data rate for transmissions associated with the base station, or
       a beamwidth of beams used by the base station.

11. The method of claim 7, wherein the beam scanning period indicator identifies a range for the interval.

12. A user equipment for wireless communication, comprising:
    a memory; and
    one or more processors operatively coupled to the memory, the memory and the one or more processors configured to:
       receive a beam scanning period indicator from a base station;
       configure an interval for beam scanning based at least in part on the beam scanning period indicator,
          wherein the beam scanning period indicator indicates a beam scanning period,
          wherein different beam scanning periods are associated with different combinations of discontinuous reception (DRX) mode cycle periods and measurement gaps of intra-frequency measurements,
          wherein a first beam scanning period is associated with a first DRX mode cycle period that satisfies a threshold and for infra-frequency measurements without measurement gaps, and
          wherein a second beam scanning period is associated with a second DRX mode cycle period that does not satisfy a threshold and for infra-frequency measurements with measurement gaps; and beam scan to measure a set of beams at the interval for beam scanning based at least in part on configuring the interval for beam scanning.

13. The user equipment of claim 12, wherein the beam scanning period indicator is received based at least in part on monitoring for the beam scanning period indicator.

14. The user equipment of claim 12, wherein the interval is configured based at least in part on a characteristic associated with the user equipment; and
wherein the characteristic relates to at least one of:
a network of the user equipment,
a mobility state of the user equipment,
a mode of the user equipment,
a use case of the user equipment,
a predicted data rate for the user equipment, or
a power consumption of the user equipment.

15. The user equipment of claim 12, wherein the interval is configured based at least in part on a characteristic associated with the base station; and
wherein the characteristic relates to at least one of:
a quantity of beams used by the base station in beam scanning,
a bandwidth for the base station,
a cell size for the base station,
a user equipment density for the base station,
a payload size associated with the base station,
a predicted data rate for transmissions associated with the base station, or
a beamwidth of beams used by the base station.

16. The user equipment of claim 15, wherein the beamwidth of beams used by the base station is determined based at least in part on one or more measurements.

17. The user equipment of claim 12, wherein the interval is configured based at least in part on an interval range identified based at least in part on the beam scanning period indicator.

18. A base station for wireless communication, comprising:
a memory; and
one or more processors operatively coupled to the memory, the memory and the one or more processors configured to:
provide, to a user equipment, a beam scanning period indicator identifying an interval for beam scanning, wherein the beam scanning period indicator indicates a beam scanning period,
wherein different beam scanning periods are associated with different combinations of discontinuous reception (DRX) mode cycle periods and measurement gaps of intra-frequency measurements,
wherein a first beam scanning period is associated with a first DRX mode cycle period that satisfies a threshold and for infra-frequency measurements without measurement gaps, and
wherein a second beam scanning period is associated with a second DRX mode cycle period that does not satisfy a threshold and for infra-frequency measurements with measurement gaps; and
provide at least one beam from a set of beams to enable the user equipment to measure the at least one beam in accordance with the interval and based at least in part on providing the beam scanning period indicator.

19. The base station of claim 18, wherein the base station is configured to provide the beam scanning period indicator based at least in part on configuring the interval for beam scanning.

20. The base station of claim 18, wherein the interval is configured based at least in part on a characteristic associated with the user equipment; and
wherein the characteristic relates to at least one of:
a network of the user equipment,
a mobility state of the user equipment,
a mode of the user equipment,
a use case of the user equipment,
a predicted data rate for the user equipment, or
a power consumption of the user equipment.

21. The base station of claim 18, wherein the interval is configured based at least in part on a characteristic associated with the base station; and
wherein the characteristic relates to at least one of:
a quantity of beams used by the base station in beam scanning,
a bandwidth for the base station,
a cell size for the base station,
a user equipment density for the base station,
a payload size associated with the base station,
a predicted data rate for transmissions associated with the base station, or
a beamwidth of beams used by the base station.

22. The base station of claim 18, wherein the beam scanning period indicator identifies a range for the interval.

* * * * *